United States Patent [19]

Brown

[11] 4,082,426
[45] Apr. 4, 1978

[54] RETROREFLECTIVE SHEETING WITH RETROREFLECTIVE MARKINGS

[75] Inventor: Robert A. Brown, St. Paul, Minn.

[73] Assignee: Minnesota Mining and Manufacturing Company, St. Paul, Minn.

[21] Appl. No.: 745,401

[22] Filed: Nov. 26, 1976

[51] Int. Cl.² .............................................. G02B 5/128
[52] U.S. Cl. ..................................... 350/105; 40/615; 350/97; 350/103; 350/106
[58] Field of Search ............... 350/105, 166, 165, 299, 350/109; 404/2, 1, 6; 40/135

[56] References Cited

U.S. PATENT DOCUMENTS

| | | | |
|---|---|---|---|
| 3,154,872 | 11/1964 | Nordgren | 350/105 |
| 3,795,435 | 3/1974 | Schwab | 350/105 |
| 3,801,183 | 4/1974 | Sevelin et al. | 350/105 |
| 3,994,086 | 11/1976 | Mizuochi | 350/105 |

*Primary Examiner*—John K. Corbin
*Assistant Examiner*—B. W. de los Reyes
*Attorney, Agent, or Firm*—Cruzan Alexander; Donald M. Sell; Roger R. Tamte

[57] ABSTRACT

Retroreflective sheeting is taught which incorporates markings that are distinctly visible when the sheeting is viewed at an angle under retroreflective viewing conditions, thereby allowing a viewer to determine the identity of the sheeting. The sheeting comprises a monolayer of microsphere-lenses; a spacing layer coated on the microsphere-lenses and contoured so as to generally follow the curved back surfaces of the microsphere-lenses; a specularly reflective layer coated over the spacing layer; and a transparent image layer disposed in an imagewise pattern between the spacing layer and specularly reflective layer, with the thickness of the image layer being greater in the valleys of the spacing layer between the microsphere-lenses than on the curved surfaces directly in back of the microsphere-lenses.

3 Claims, 3 Drawing Figures

RETROREFLECTIVE SHEETING WITH RETROREFLECTIVE MARKINGS

INTRODUCTION

The present invention is directed to retroreflective sheet materials of the general type taught in Nordgren, U.S. Pat. No. 3,154,872, which incorporate legends or markings within the sheeting to give the sheeting a distinctive identity.

The present invention is an advance in the art of such sheet materials in that it provides a new kind of marking that has unique retroreflective characteristics which make it possible to rapidly and easily recognize and distinguish the sheet material from other sheet materials, without any elaborate or destructive type of testing. These unique reflective characteristics also make the marking difficult for unauthorized persons to duplicate or "counterfeit."

Reflective sheeting of the invention is generally similar to sheeting taught in Nordgren in that it comprises a monolayer of microsphere-lenses adapted to receive light rays incident on the front surface of the sheeting; a spacing layer of polymeric material coated onto the microsphere-lenses and contoured so as to generally follow the curved back surfaces of the microsphere-lenses; a specularly reflective layer coated over the spacing layer; and an image layer coated in an imagewise pattern between said spacing layer and specularly reflective layer. However, sheet material of the invention is distinctive from Nordgren in the characteristics of the image layer. Whereas the image layer in Nordgren's construction is semi-specular, e.g., through the inclusion of metal pigment, the image layer in reflective sheeting of this invention is essentially transparent, such that light rays can be transmitted to the specularly reflective layer behind the image layer and then reflected by the specularly reflective layer. Further, besides being transparent, the image layer varies in thickness, with the thickness being greater in the valleys of the spacing layer between the microsphere-lenses than on the curved areas directly in back of the microsphere-lenses.

The variably-thick transparent image layer in reflective sheeting of the invention, by changing the spacing between the specularly reflective layer and the microsphere-lenses, changes the reflective characteristics of the sheeting. A primary change is as to reflection of light striking the sheeting at a large angle of incidence (i.e. light striking the sheeting at a large angle from a line perpendicular to the sheeting). Such light rays are focused by the microsphere-lenses into the valley areas, where the image layer is thickest. The increased thickness of the image layer in the valley areas displaces the specularly reflective layer from the focal locus of the large-incident-angle light rays, and this displacement causes a reduction in the retroreflection of those light rays. The result is that, although markings in sheeting of the invention may be, and preferably are, invisible when the sheeting is viewed under retroreflective viewing conditions from a position perpendicular to the sheeting, they become visible when the sheeting is viewed at an angle under retroreflective viewing conditions. The visibility of markings at an angle is a distinctive effect, permitting a person reviewing the sheeting to determine its identity.

To achieve a desired degree of visibility for the markings in reflective sheeting of the invention, the reduction in retroreflection in the image areas should be sufficient to provide a good contrast with the specular reflection occurring in the nonimage, or background, areas. For purposes herein, contrast can be described in terms of the difference in retroreflective brightness between the image and nonimage areas at 45° angles of incidence (light traveling to the sheeting at an angle of 45° from a line perpendicular to the sheeting). In general, images will be discernible under retroreflective viewing conditions at an angle of 45°, if the retroreflection of 45° incident light from the image areas of the sheeting is at least 30 percent less than the retroreflection of 45° incident light from nonimage areas (because of the limited sensitivity of measuring instruments, measurements should be made on image areas and nonimage areas that are at least one square inch in size); and to achieve good legibility the retroreflection from image areas should be at least 35 percent, and preferably at least 40 percent less than it is from the nonimage areas.

Transparent layers have previously been incorporated in imagewise pattern into reflective sheeting to modify the retroreflective characteristics of the sheeting; see, for example, Sevelin et al, U.S. Pat. No. 3,801,183. But the use of an image layer that is more thick in the valley areas than on the curved peaks of the spacing layers achieves special added effects as described, which give the sheeting additional utility.

DETAILED DESCRIPTION

Figure 1:
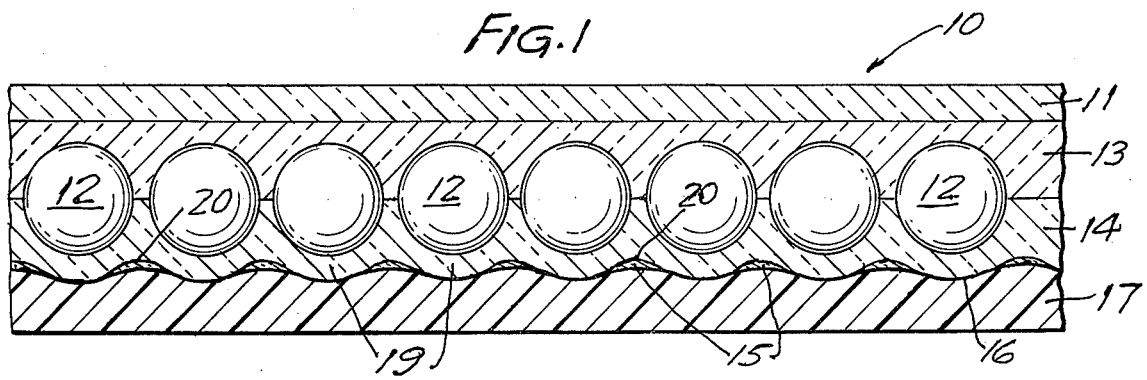
FIG. 1 is a cross-section through an idealized representative reflective sheeting of the invention.

The representative reflective sheeting of the invention 10 shown in FIG. 1 comprises a top layer 11; a monolayer of transparent microsphere-lenses 12, typically glass microspheres, supported in a layer 13 of transparent binder material; a spacing layer 14 coated over the back surfaces of the microsphere-lenses 12 and contoured so as to follow the curved surface of the back of the microspheres; an image layer 15 coated onto the spacing layer; a specularly reflective layer 16 coated over the spacing layer and image layer; and a back layer 17, such as a layer of adhesive or other polymeric material which, among other things, protects the specularly reflective layer, provides a means for attachment of the sheeting to a substrate, and provides further strength to the sheet material.

Except for the image layer, the structure shown in FIG. 1 is conventional, and methods for its formation are well known in the art. For example, the procedures described in Nordgren form such a structure, although the drawings of the Nordgren patent are simplified to show the spacing layer as flat. The drawing in FIG. 1 is also simplified or idealized in that microsphere-lenses 12 are shown to be all of the same size, and are shown to be evenly spaced in a perfect monolayer. In fact, the size of the microsphere-lenses statistically varies within a range, and the microspheres are not arranged in a perfect monolayer at a uniform spacing.

After the spacing layer 14 has been formed, the image layer 15 is applied in an imagewise pattern, typically by conventional printing techniques. A coating material or ink is used that has viscosity characteristics such that the ink will flow from the curved peaks 19 of the spacing layer directly in back of the microsphere-lenses down into the valleys 20 between the sphere-lenses, which causes the image layer to be thicker in the valleys than it is over the curved peaks as shown in FIG. 1.

Figure 2:
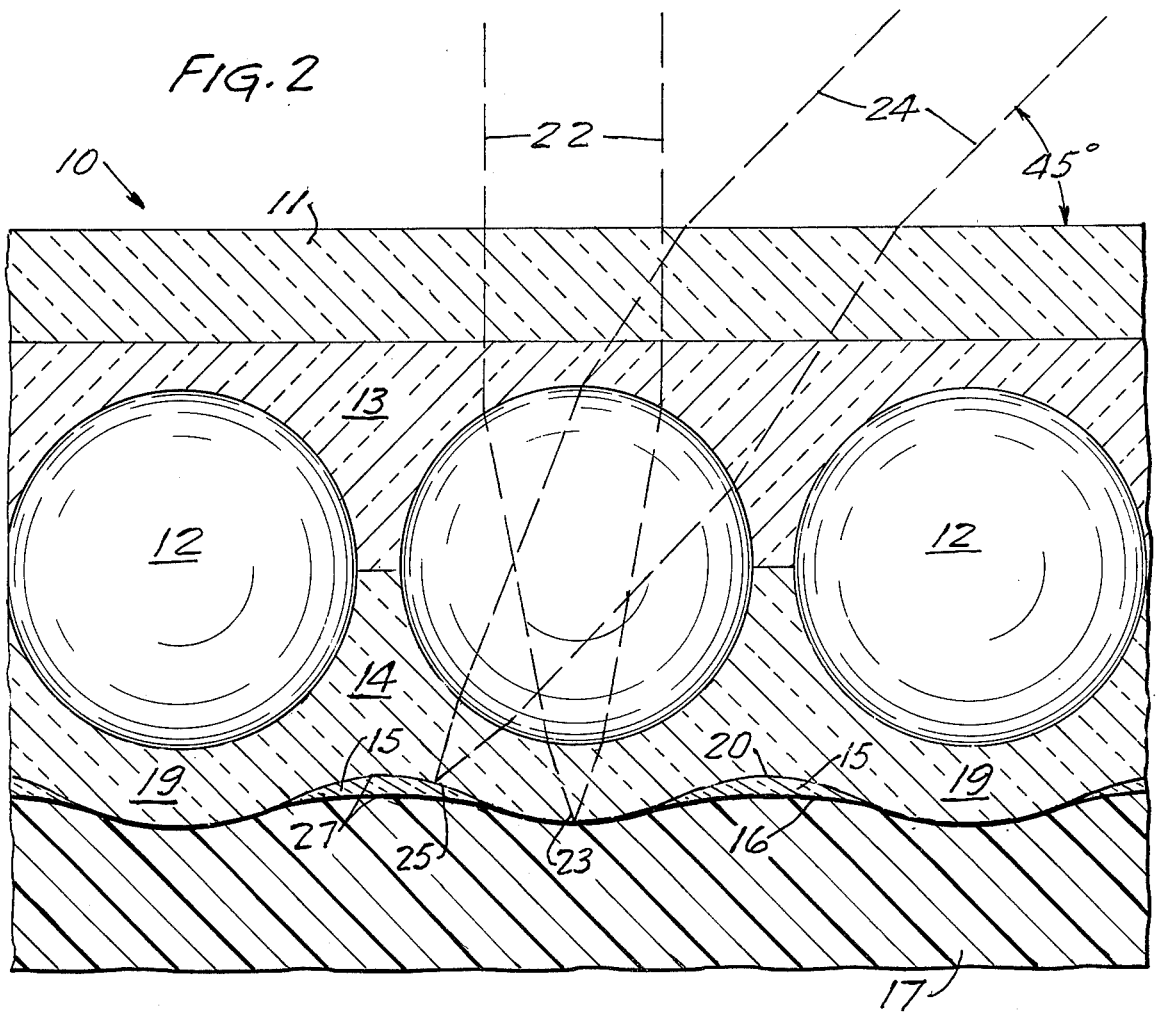
FIG. 2 is a cross-section through a portion of the sheeting shown in FIG. 1, further enlarged to assist in showing features of the invention.

The consequence of this variation in thickness of the image layer is shown in FIG. 2. Paraxial light rays 22 traveling perpendicularly to the reflective sheeting are focused by the microsphere-lenses 12 to a spot 23 (because spheres are not a perfect lens, the light rays are focused to a spot rather than a point) near the edge of the spacing layer 14. However, the specularly reflective layer 16 is close enough to the edge of the spacing layer, and the focal "spot" is large enough, so that the displacement of the specularly reflective layer causes only a very slight reduction in the brightness of the retroreflection of the perpendicular light rays. But for light rays 24 incident on the sheeting at a 45° angle, the summation of the thickness of the spacing layer 14 and image layer 15 in the valleys 20 between the microsphere-lenses, through which the 45° angle light rays must pass, is such as to space the specularly reflective layer 16 beyond the focal spot or locus 25 for the rays 24. The result is that the 45° light rays are not reflected with the same magnitude as the perpendicular light rays.

The imaging layer 15 should be transparent but can be colored with transparent dyes or pigments to either match or contrast with the rest of the sheeting. The coloring can be chosen to either camouflage the markings or make them visible under ordinary daylight viewing conditions (the latter comprise viewing with ambient outdoor light during the daylight hours, and are in contrast with retroreflective viewing conditions in which a concentrated beam of light is directed toward the reflective sheeting and the viewer is located slightly off the axis of the light beam). Suitable coloring agents include transparent organic pigments such as phthalocyanine green, phthalocyanine blue, and perylene red, and transparent dyes such as "Marrolex Blue RR" supplied by Verrona.

The vehicle of the coating composition or ink from which the image layer 15 is formed most typically comprises a solution of a polymeric material in a volatile solvent, but compositions of the right viscosity can be obtained with solventless systems also. The viscosity of the liquid needed for it to flow in a desired manner from the curved backs 19 of the spacing layer 14 into the valleys 20 can be empirically determined, based on a desired printing technique. Presently gravure printing techniques are preferred to produce the desired variation in thickness between the back surfaces and the valleys, and for such techniques the viscosity will generally be less than 100 seconds, No. 2 Zahn cup. The needed viscosity may vary from press to press, and if the ink is too viscous, diluent can be added.

Suitable polymeric film-forming binder materials for inclusion in the coating composition for the image layer include vinyl acetate, vinyl chloride, acrylics, and numerous other polymers from which suitable flow characteristics can be achieved. These binder materials may be dissolved or dispersed in various liquids, most typically organic solvents selected from ketones, esters, aromatic hydrocarbons, and alcohols.

The thickness of the image and spacing layers depends on the index of refraction of the microsphere-lenses and the diameter of the microsphere-lenses. In a typical sheet material as shown in FIGS. 1 and 2, using microsphere-lenses of about 2.25 index of refraction with an average diameter of about 60 micrometers, the spacing layer is generally about 12 micrometers thick, and the image layer should have a thickness over the curved back surfaces 19 of 0 to about 0.5 micrometer, and in the valley areas (the dimension 27 in FIG. 2) of about 1 micrometer or more, usually up to about 3 micrometers. As these values indicate, the thickness of the image layer should generally be at least twice as thick in the valley areas between the microspheres as it is on the curved back surfaces of the microspheres to achieve a distinctly visible contrast between the retroreflection in the image and nonimage areas of 45° incident light.

One advantage obtained by the present invention over sheeting as described in the previously mentioned Nordgren, U.S. Pat. No. 3,154,872, is a greater freedom in the dimensions of the images formed by the image layer. Nordgren teaches that the semi-specular legends should be not greater than 1/64-inch in width so as to avoid visibility of the markings under perpendicular retroreflective viewing conditions and to minimize reduction in useful retroreflection from the sheeting. But since the image layer in sheeting of the invention is transparent, and has only a slight effect in reducing the retroreflection of perpendicular light rays, the images in sheeting of the invention can be of very large width without making the markings visible under perpendicular retroreflective viewing conditions and without seriously reducing retroreflection. The result is a greater freedom in designing identifying symbols in sheeting of the invention. In general, the image layer in sheeting of the invention is sufficiently transparent, even when colored rather than clear, so that the retroreflection from a one-square-inch image area under perpendicular retroreflective viewing conditions is at least 85 percent and preferably at least 90 percent as bright as it is from a nonimage area.

Another advantage of reflective sheeting of the invention is that the distinctiveness of markings of the invention can be determined visually and without any other tests. For example, printing of marks on the top surface of reflective sheeting can produce visual effects similar to those obtained with the Nordgren sheet material. Detection of a counterfeit material of that type requires destructive examination of the sheeting, i.e., abrasion of the sheeting to determine whether a counterfeit marking is printed on the surface of the sheeting.

The principal structure of reflective sheeting of the invention is made by methods well known in the art and taught in such prior-art patents as Nordgren, U.S. Pat. No. 3,154,872 or Palmquist et al, U.S. Pat. No. 2,407,680. One typical procedure for making a product as shown in FIG. 1 comprises the steps of coating the layer 11 onto a flat or smooth-surfaced release liner; coating the support layer 13 onto the layer 11; cascading microsphere-lenses 12 onto the layer 13, with the microspheres preferably being treated with surface active agents according to Weber et al, U.S. Pat. No. 3,222,204 so that the microsphere-lenses will float at their approximate hemispheres or midpoints; drying the support layer 13; coating the spacing layer 14 over the microspheres 12 and the support layer and then drying the layer; printing and then drying the image layer 15; coating the specularly reflective layer 16, typically by vapor-deposition techniques; and coating and drying the back layer 17.

Figure 3:
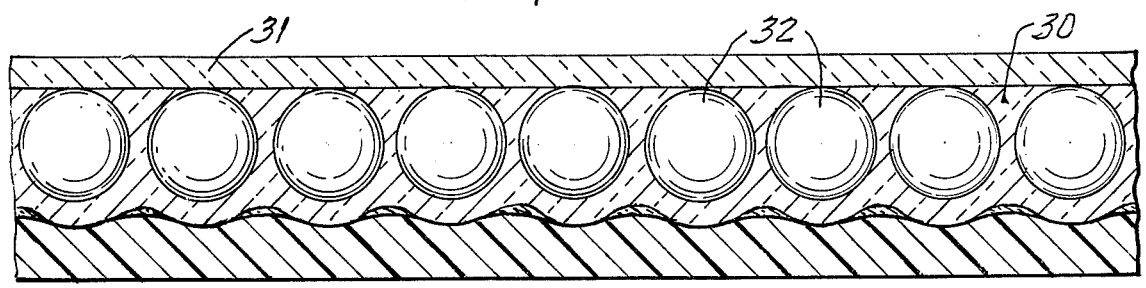
FIG. 3 is a cross-section through another illustrative reflective sheeting of the invention.

The invention is useful with other types of sheeting besides that shown in FIG. 1. For example, it may take the form shown in FIG. 3, in which the binder and spacing layer for the microsphere-lenses are combined as one material or layer 30. Such a construction can be made, for example, by dispersing the microsphere-lenses in the coating material for the layer 30, and coating that mixture onto a top film 31. In such a construction, the microsphere-lenses 32 tend to settle against the top film 31.

The following example further illustrates the invention. Sheet material as shown in FIG. 1 except for the image layer, specularly reflective layer, and back layer was formed by known techniques. Thereupon the following composition was printed in an imagewise pattern onto the surface of the spacing layer using a rotogravure printer set so that it would apply 1.2 micrometers (dry) of coating material if the coating was on a flat surface. This composition has a viscosity of 60 seconds, No. 2 Zahn cup, and flowed into the valley areas to form an image layer as shown in FIG. 1.

|  | Parts by Weight |
| --- | --- |
| Resin comprising 91 weight-percent vinyl chloride and 7 weight-percent vinyl acetate (VAGH resin supplied by Union Carbide) | 23.3 |
| Methyl ethyl ketone | 26.2 |
| Cyclohexanone | 33.3 |
| Toluene | 11.7 |
| Plasticizer (Admex 710 supplied by Ashland) | 3.8 |
| Heat-stabilizer (Ferro 840 supplied by Ferro Corporation) | 0.7 |
| Heat-stabilizer (Ferro 904) | 0.5 |

The printed layer was allowed to dry by heating the sheeting in a convection oven, after which a thin layer of aluminum was vapor-deposited onto the exposed areas of the spacing layer and imaging layer to form the specularly reflective layer 16 shown in FIG. 1. (Other specularly reflective materials such as gold, silver, or dielectric coatings as taught in Bingham, U.S. Pat. No. 3,700,305, could also be used.) Next a layer of acrylic adhesive was coated onto a liner and then laminated to the layer of aluminum.

When the reflective sheeting as described was viewed under ordinary daylight viewing conditions, no image was apparent in the sheet material. Further when the sheet material was illuminated and viewed under retroreflective viewing conditions with light incident on the sheeting at 0° (i.e. perpendiular to the sheeting), no image was apparent. But when the sheet material was viewed under retroreflective viewing conditions with 45° incident light, the image was visible.

In a second example, in which the sheeting prepared had markings visible under ordinary daylight viewing conditions, 21 parts of a red pigment (perylene red dispersed in VAGH resin) were added to 40 parts of the clear coating solution described above, together with 39 parts of a cyclohexanone. The resulting mixture was then diluted by adding 92.5 parts of the clear coating composition described above to 7.5 parts of the mixture, and the final mixture was used to print the image layer.

What is claimed is:

1. Reflective sheeting comprising a monolayer of microsphere-lenses adapted to receive light rays incident on the front surface of the sheeting, a spacing layer of polymeric material covering the back surfaces of the microsphere-lenses and contoured so as to generally follow those back surfaces, a specularly reflective layer coated over the spacing layer, and an image layer disposed in an imagewise pattern between the spacing layer and specularly reflective layer; characterized in that the image layer is transparent and in that the thickness of the image layer is greater in the valleys of the spacing layer between the microsphere-lenses than on the curved surfaces directly in back of the microsphere-lenses, whereby the 45° retroreflection from the image areas of said sheeting is at least 30 percent less than the retroreflection from nonimage areas.

2. Sheeting of claim 1 in which the image layer has a color different from the color of the spacing layer so that images are visible under ordinary daylight viewing conditions.

3. Sheeting of claim 1 in which the image layer has the same color as the spacing layer, whereby images are indiscernible under ordinary daylight viewing conditions.

* * * * *